Dec. 22, 1970 W. G. KINSINGER 3,549,381

PACKAGING MATERIAL

Filed Dec. 26, 1967 3 Sheets-Sheet 1

WILLIAM G. KINSINGER
*INVENTOR.*

BY

ATTORNEY

WILLIAM G. KINSINGER
INVENTOR.

BY *Marion C. Staves*

ATTORNEY

Dec. 22, 1970   W. G. KINSINGER   3,549,381
PACKAGING MATERIAL

Filed Dec. 26, 1967   3 Sheets-Sheet 3

WILLIAM G. KINSINGER
INVENTOR.

BY

ATTORNEY

United States Patent Office 3,549,381
Patented Dec. 22, 1970

3,549,381
PACKAGING MATERIAL
William G. Kinsinger, Indian Field, Wilmington, Del., assignor to Hercules Incorporated, Wilmington, Del., a corporation of Delaware
Filed Dec. 26, 1967, Ser. No. 693,370
Int. Cl. A23f *3/00;* B65b *29/00*
U.S. Cl. 99—77.1
7 Claims

ABSTRACT OF THE DISCLOSURE

A flexible impervious packaging material comprising a thermoplastic film having a regularly spaced embossed pattern on at least one surface which has been drawn sufficiently to develop a preferential weakness in one direction so that the film will open into a netlike structure when stretched in the direction transverse to the first drawing and packages prepared from said material.

---

This invention relates to packaging material. More particularly this invention relates to impervious thermoplastic packaging material especially food packaging material in the form of film which when stretched becomes liquid and air pervious open netting and the packages prepared from said material.

Food packages prepared from thermoplastic sheets and films are known in the art. However, the prior art packages must be torn open in order to allow contact between their contents and the atmosphere or a liquid. Once torn open to permit the passage of a liquid (e.g., water) said packages will not retain their contents.

It is an object of this invention, therefore, to provide thermoplastic packaging material which is strong, flexible and impervious to moisture, dirt, insects and the like and which helps to retain the flavor, aroma, etc., of material packaged therein.

It is a further object of this invention to provide strong, flexible impervious thermoplastic packaging material which, when stretched or drawn, opens in a uniform pattern to permit the passage of liquids and/or small particles.

Now in accordance with this invention these objectives and others have been achieved by providing packaging material in the form of embossed film, i.e., having a regularly spaced relief or recessed pattern on at least one surface, which has been drawn sufficiently to develop a preferential weakness in one direction so that the film opens into a net when stretched or drawn transverse to the first draw.

Suitable thermoplastic materials for use in this invention are polyethylene, polypropylene, polyamides, poly (vinyl chloride), polyethers, ethylene copolymers, such as ethylene-propylene copolymers, ethylene-vinyl acetate copolymers, ethylene-methyl acrylate copolymers and the like.

As stated above, the packaging material is embossed, that is, it has regularly spaced relief or recessed patterns on at least one surface. These embossed patterns are arranged in such a way that the preferential weakness developed on drawing the film is interrupted at regular intervals. Thus, when the film is stretched transverse to the first draw a multiplicity of short splits appear and develop into a netlike structure. Within this broad definition it can be easily seen that there are an infinite number of permutations involving embossed patterns. For example, in the case of a relief embossed pattern the surface of the film can be produced with a regular pattern of small solid bosses or raised figures arranged with valleys or spaces between adjacent bosses, said bosses or raised figures staggered in each adjacent row and extending partly through the thickness of the film. In the case of a recessed embossed pattern the surface of the film can be produced with a regular pattern of small nonconnecting cavities or depressions therein which extend partly through the thickness of the film. The raised or recessed pattern may be square, diamond shape, rectangular, hexagonal, circular or the like. Typical patterns are shown by way of example in FIGS. 1–9.

Figure 1:
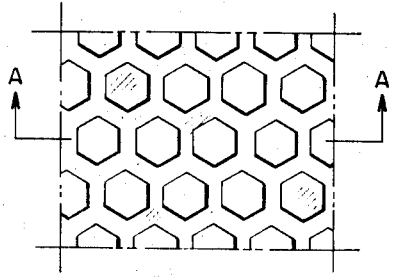
FIG. 1 is an enlarged plan view of a portion of a film of thermoplastic material embossed with a raised pattern of hexagonal bosses arranged in parallel rows in one surface thereof.
Figure 4:
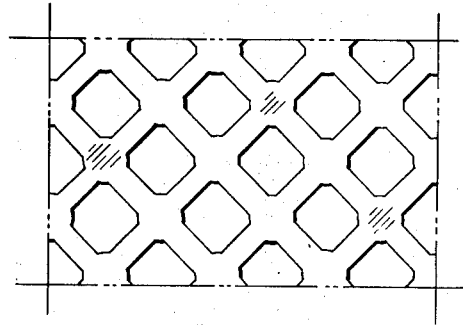
FIG. 4 shows the material of FIG. 3 stretched or drawn so as to form an open-work netting.
Figure 2:
FIG. 2 is a section on the line A—A of FIG. 1 (enlarged insofar as the thickness is concerned to a much greater scale than the enlargement of FIG. 1).

The embossed thermoplastic film used in this invention can be formed by several methods. One preferred method is to extrude the thermoplastic through a flat slit die onto the nip of two metal rolls. One or both rolls have the replica of the desired embossed pattern. The embossing is accomplished by impressing the pattern into the hot thermoplastic while it is still molten. The degree of emboss is controlled by adjusting the temperature of the rolls, the angle of molten slit approach to the rolls and the nip pressure. The embossed film can be drawn at the time it is embossed or at some later date. In any event the film is simply given a linear draw between two sets of rolls turning at different speeds. The amount of draw must be sufficient to impart a preferential weakness in one direction so that the film opens into a net when stretched or drawn transverse to the first draw. The first draw can be effected under various conditions. However, in general the film will be drawn from about 100% to about 300% at an elevated temperature which will depend upon the specific thermoplastic being drawn. The thickness of the film can vary over a wide range but in general will be from about 4 mils to about 20 mils. The size and number of openings in the packaging material after it has been stretched will depend upon the embossed pattern. In general the number of openings per square inch will vary from about 30 per square inch to about 800 per square inch with the size of the openings varying from about 0.1 inch to about 0.03 inch across the widest dimension.

As stated above, the packaging material is particularly well adapted for packaging all types of food both dry and fresh. For example, in packaging dry foods such as noodles or macaroni the impervious thermoplastic material keeps the food clean and free of insects during storage. It can be printed upon and opened by merely stretching and need not be removed for cooking. In fact, the water insoluble netting facilitates the handling of food in boiling water and the drainage of water therefrom after the food has been cooked. The impervious thermoplastic material can also be used in the packaging of fresh foods such as spinach, green beans, brussels sprouts and the like. Again the food need not be removed from the package for cooking. The package has only to be stretched to form a net containing the food. Another preferred application for the packaging material is in the production of small individual containers for dry food seasonings such as table salt, pepper, monosodium glutamate and the like. In the case of packages containing seasonings, one need only stretch a corner thereof and then sift out the desired amount of the contents. Still another prefered application for the packaging material is in the production of individual tea bags. In the case of tea or of seasonings the packaging material helps to retain the desirable flavor, aroma, etc. While food packaging is the preferred use for the packaging material of this invention, it can be used in many other packaging applications. For example the material of the invention is excellent for packaging dry detergents, abrasive cleansers, insecticides and the like.

Packages of various shapes and sizes can be produced according to procedures known int he art. After the desired contents have been placed in the package it can be readily sealed by fusing the open ends. Packages can be prepared with both sides of the embossed packaging material or only one side. For example, food packages can be prepared by fusing at the edges a plain sheet of thermoplastic wrapping material and an embossed drawn sheet of packaging material of this invention. If desired tabs or loops can be provided by which the package can be grasped when stretching. The provision of tabs or loops is beneficial in that they indicate the direction in which the package is to be stretched. It may also be desirable to seal a ribbon or string inside the package to prevent its being stretched so far that it tears.

Typical packages are shown in FIGS. 10 through 14.

Figure 10:
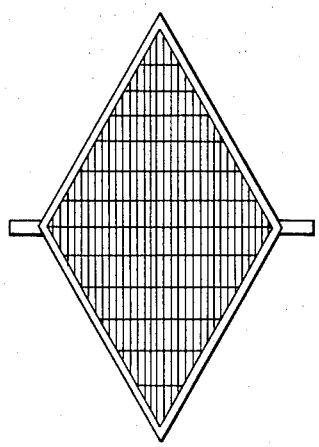
Figure 8:
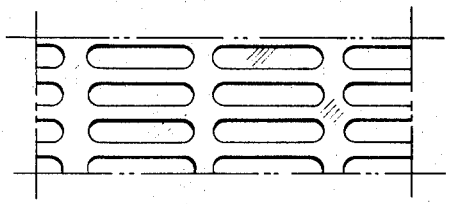
FIG. 8 is an enlarged plan view of a portion of a film of packaging material in accordance with this invention which has been produced by drawing the material of FIGS. 5, 6 and 7 sufficiently to develop a preferential weakness in one direction.

FIG. 10 is a view of a diamond shaped package provided wtih sealed-in tabs on the corners defining the minor axis of the diamond. These tabs can be pulled when one wishes to open up the netting.

Figure 11:
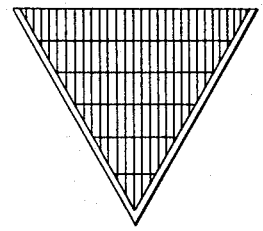
Figure 9:
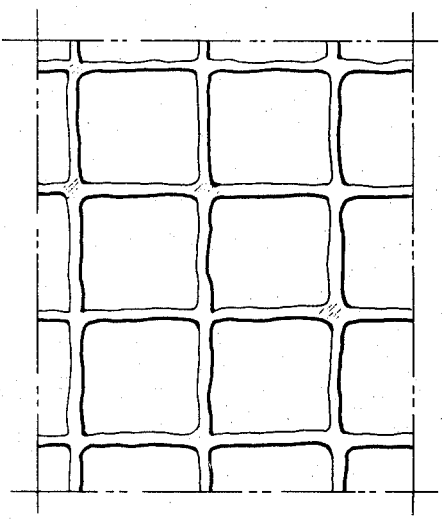
FIG. 9 shows the material of FIG. 8 stretched or drawn so as to form an open work netting.

FIG. 11 is a view of a triangular shaped package which is assembled by merely joining two opposite corners and heat sealing the open sides.

Figure 12:
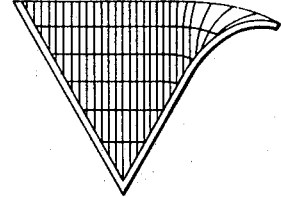

FIG. 12 is a view of the package of FIG. 11 after one corner has been pulled.

Figure 13:
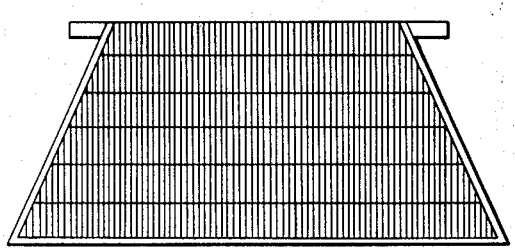

FIG. 13 is a view of a trapezoidal shaped package provided with sealed-in tabs on the corners defining the short side of the trapezoid.

Figure 14:
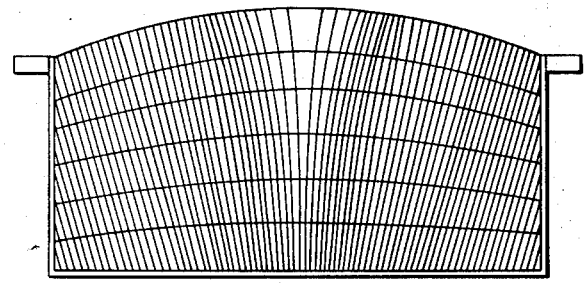

FIG. 14 is a view of the package of FIG. 13 after it has been stretched by means of the tabs.

The following examples will serve to illustrate the invention.

EXAMPLE 1

A sample of high density polyethylene having a melt flow of 4.0 ($I_2$ at 190° C.) and a molecular weight of approximately 90,000 is extruded from a flat die with a 0.015 inch gap. It is drawn down to a thickness of approximately 0.006 inch before reaching the nip of the embossing rollers. On passing through the rollers the film is embossed on one side with a hexagonal relief pattern of approximately 500 hexagons per square inch. The thus embossed film is then drawn linearly 300% so as to develop a preferential weakness in the transverse direction. The resulting strong, flexible and impervious film has a weight of 1.5 ounces per square yard.

A food package is prepared from the film as follows. Two identical diamond shaped sheets are cut from the film with the major axis of the diamond running in the linear direction. The sheets are 8 inches on each side. A package as shown in FIG. 10 is formed by superimposing one sheet on the other with ½" by 2" by 2 mil, tabs of high density polyethylene inserted a short way in between the sheets at the corners defining the minor axis of the diamond, and then sealing three of the open sides using an impulse sealer with an impulse time of ½ second, a dwell time of one second, a temperature of 315° F. and a pressure of 20 p.s.i. Approximately ½ cup of elbow macaroni in the package through the open side. The open side is then heat sealed as described above. The resulting package of macaroni when subjected to normal handling is found to be undamaged. When the package is grasped by the tabs and stretched so as to form a square, the embossed and drawn material opens into a net. The package is then placed in a pot with two quarts of water and brought to a boil. After boiling for approximately 12 minutes, the package is removed from the water with a pair of tongs and the water drained. An examination of the package shows that the seals are all intact and strong.

EXAMPLE 2

A sample of high density polyethylene as described in Example 1 is extruded from a flat die with a 0.015 inch gap and drawn down to a thickness of approximately 0.005 inch. It is then passed through embossing rollers and given a hexagonal relief pattern of approximately 2500 hexagons per square inch. The thus embossed film is drawn linearly 300% so as to develop the preferential weakness in the transverse direction. The resulting film is strong, flexible, impervious and has a weight of 1.0 ounce per square yard.

An individual salt package is prepared by cutting a diamond shaped sheet from the film with the major axis of the diamond running in the linear direction. The diamond is 1½" on each side. The diamond is folded along its minor axis and one open side sealed with an impulse sealer as described in Example 1. Approximately ½ teaspoon of salt granules is placed in the package through the open side. The open side is then heat sealed as described above. The resulting package of salt when subjected to normal handling is found to be undamaged. When the package is stretched from one of the corners formed by a sealed side and the folded material, an open work netting forms adjacent the corner from which salt can be dispensed.

EXAMPLE 3

A tea bag is prepared from the packaging film described in Example 2. Two identical diamond shaped sheets are cut from the film with the major axis of the diamond running in the linear direction. The sheets are 1½ inches on each side. A bag is formed by superimposing one sheet on the other, inserting a ¼" x 3" x 0.5 mil tab of high density polyethylene a short way in between the sheets at one of the corners defining the minor axis of the diamond and then sealing three open sides using an impulse sealer as described in Example 1. Approximately 0.08 ounce of dry tea leaves are placed in the bag through the open side. The open side is then sealed as described above. The resulting tea bag when subjected to normal handling is found to be undamaged. The tea bag can be stored for long periods of time without the tea leaves losing their flavor. A cup of tea is prepared using the tea bag as follows. The tea bag is grasped by the tab and the corner opposite the tab and then stretched so as to form a square shaped package. As the thermoplastic material is stretched it opens up forming a fine netlike material. The tea bag is immersed in hot water for 30 seconds and then removed. Upon removing the bag, it is noted that no tea fines are present in the liquid and no taste is imparted by the packaging material.

EXAMPLE 4

Figure 5:
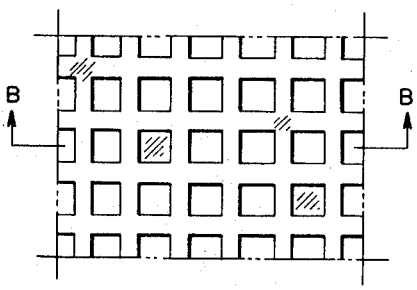
FIG. 5 is an enlarged plan view of a portion of a film of thermoplastic material having a uniform arrangement of cavities in one surface thereof.
Figure 3:
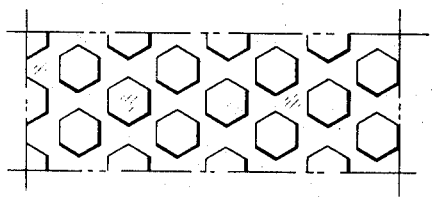
FIG. 3 is an enlarged plan view of a portion of a film of packaging material in accordance with this invention which has been produced by drawing the material of FIGS. 1 and 2 sufficiently to develop a preferential weakness in one direction.
Figure 6:
FIG. 6 is a section on the line B—B of FIG. 5 (enlarged insofar as the thickness is concerned to a much greater scale than the enlargement of FIG. 5).
Figure 7:
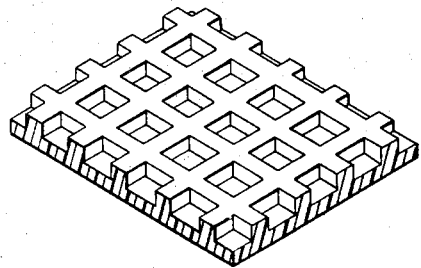
FIG. 7 is an isometric view of the portion of material shown in FIGS. 5 and 6.

Embossed packaging material is prepared from stereoregular polypropylene having a melting point of 165° C. and a molecular weight of approximately 300,000. The material is prepared as described in Example 1 except that it is embossed with a recessed rectangular pattern as shown in FIG. 5 and has approximately 400 squares per square inch.

A food package containing fresh green beans is prepared from the film as follows. Two identical circular shaped sheets having diameters of 12 inches each are cut from the film. A package is formed by superimposing one sheet on the other and then sealing the edges approxiamtely ¾ of the way around the circumference using an impulse sealer as described in Example 1. Approximately two cups of fresh green beans are placed in the package through the open side. The open side is then heat sealed as described above. The resulting package of fresh beans when subjected to normal handling is found to be undamaged. When the package is grasped by the edges transverse to the linear direction of the film and stretched, it forms an open work net package. The package is then placed in a pot with one quart of water and brought to a boil. After boiling for approximately 10 minutes the package is removed from the water with a pair of tongs and the water drained. An examination of the package shows that the seals are all intact and strong.

EXAMPLE 5

Embossed packaging material is prepared from poly (vinyl chloride) having a molecular weight of approximately 10,000 and a softening point of 90° C. The material is prepared as described in Example 1 except that it is embossed with a hexagonal relief pattern of approximately 1600 hexagons per square inch on both sides. After drawing to develop a preferential wheakness in the transverse direction, the resulting strong, flexible and impervious film has a weight of 1.75 ounces per square yard.

A package containing abrasive type cleansing powder is prepared from the film as follows. A sample of the film is cut to form a six-sided sheet which when folded in the center forms the trapezoidal shape shown in FIG. 13 (the fold line being transverse to the direction the film was drawn). The six-sided sheet measures 4 inches at the fold line, 7 inches at the sides parallel to the fold line and 10 inches overall in the longest direction. A bag is formed by folding the above-described sheet along the fold line, inserting ½" by 2" by 2 mil tabs of poly(vinyl chloride) a short way in between the folded sides at the corners adjacent the fold line and then heat sealing the two sides adjacent the fold line with an impulse sealer as described in Example 1. Approximately ¾ cup of abrasive cleansing powder is placed in the bag through the open side and the open side heat sealed. The resulting package when subjected to normal handling is found to be undamaged. When the package is grasped by the tabs and stretched so as to form a square, a section of the material forms an open net as shown in FIG. 14. By shaking the package the cleansing powder is dispensed.

From the above it will be obvious that the packages of this invention can be prepared containing all sorts of solid materials, especially particulate materials. While the above examples show heat sealing the open sides, other methods of sealing, such as with adhesives, can be used.

What I claim and desire to protect by Letters Patent is:

1. A package comprising (1) a protective outer packaging material of a flexible, impervious, thermoplastic film and (2) solid contents, at least a portion of said film having a regularly spaced embossed pattern on at least one surface which has been drawn sufficiently to develop a preferential weakness in one direction so that the film will open into a netlike structure when drawn transverse to the first draw.

2. The package of claim 1 wherein the solid contents is edible.

3. The package of claim 1 wherein the solid contents is an abrasive type cleansing powder.

4. The package of calim 1 wherein the solid contents is a dry detergent.

5. The package of claim 1 wherein the solid contents is an insecticide.

6. A tea bag comprising tea leaves enclosed in an impervious, flexible, thermoplastic protective film, at least a portion of said film having a regularly spaced embossed pattern on at least one surface which has been drawn sufficiently to develop a preferential weakness in one direction so that the film will open into a net-like structure when drawn transverse to the first draw.

7. In a method of packaging solid material which comprises (1) placing said solid material in a flexible, impervious thermoplastic container and (2) heat sealing the open sides of said container, whereby there is provided a package impervious to deleterious material, the improvement of using as at least a portion of said container, a flexible, impervious, thermoplastic packaging film having a regularly spaced embossed pattern on at least one surface which has been drawn sufficiently to develop a preferential weakness in one direction so that the film will open into a net-like structure when drawn transverse to the first draw.

References Cited

UNITED STATES PATENTS

| 1,557,032 | 10/1925 | Cooper | 99—77.1 |
| 3,137,746 | 6/1964 | Seymour et al. | 264—73 |
| 3,373,043 | 3/1968 | Rubenstein | 99—77.1 |
| 3,386,876 | 6/1968 | Wyckoff | 264—289X |

FRANK W. LUTTER, Primary Examiner

S. H. MARKOWITZ, Assistant Examiner

U.S. Cl. X.R.

99—171; 206—56; 229—7

PO-1050
(5/69)

UNITED STATES PATENT OFFICE
CERTIFICATE OF CORRECTION

Patent No. 3,549,381  Dated December 22, 1970

Inventor(s) William G. Kinsinger (Case 3)

It is certified that error appears in the above-identified patent and that said Letters Patent are hereby corrected as shown below:

Column 4, line 7, -- is placed -- should be inserted between " macaroni in ".

Column 5, line 30, " wheakness " should be -- weakness --.

Claim 7, lines 30 and 31, between " impervious thermoplastic " insert -- protective --.

SIGNED AND
SEALED
MAR 9 1971

(SEAL)
Attest:

Edward M. Fletcher, Jr.
Attesting Officer

WILLIAM E. SCHUYLER
Commissioner of Pat